March 1, 1932.  B. HEYMANN  1,847,482
LIGHT PROJECTOR
Filed July 23, 1928   3 Sheets-Sheet 1

Bruno Heymann,
Inventor

March 1, 1932.  B. HEYMANN  1,847,482
LIGHT PROJECTOR
Filed July 23, 1928  3 Sheets-Sheet 2
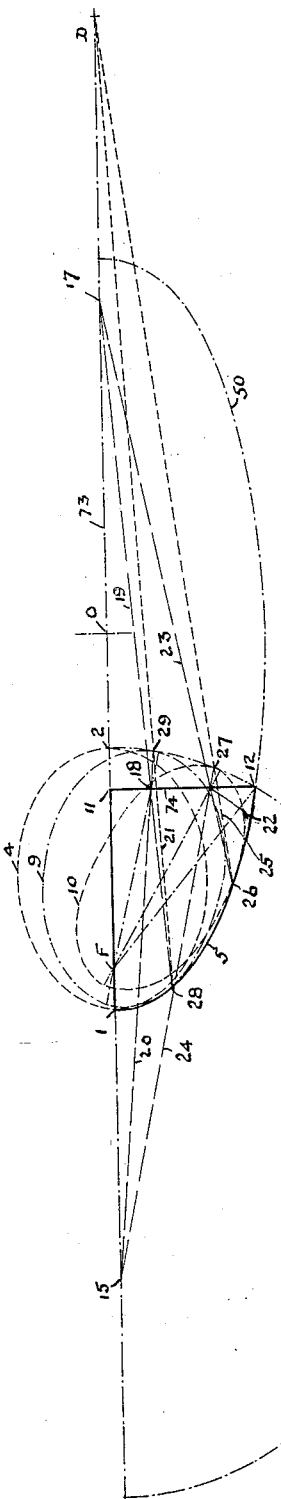
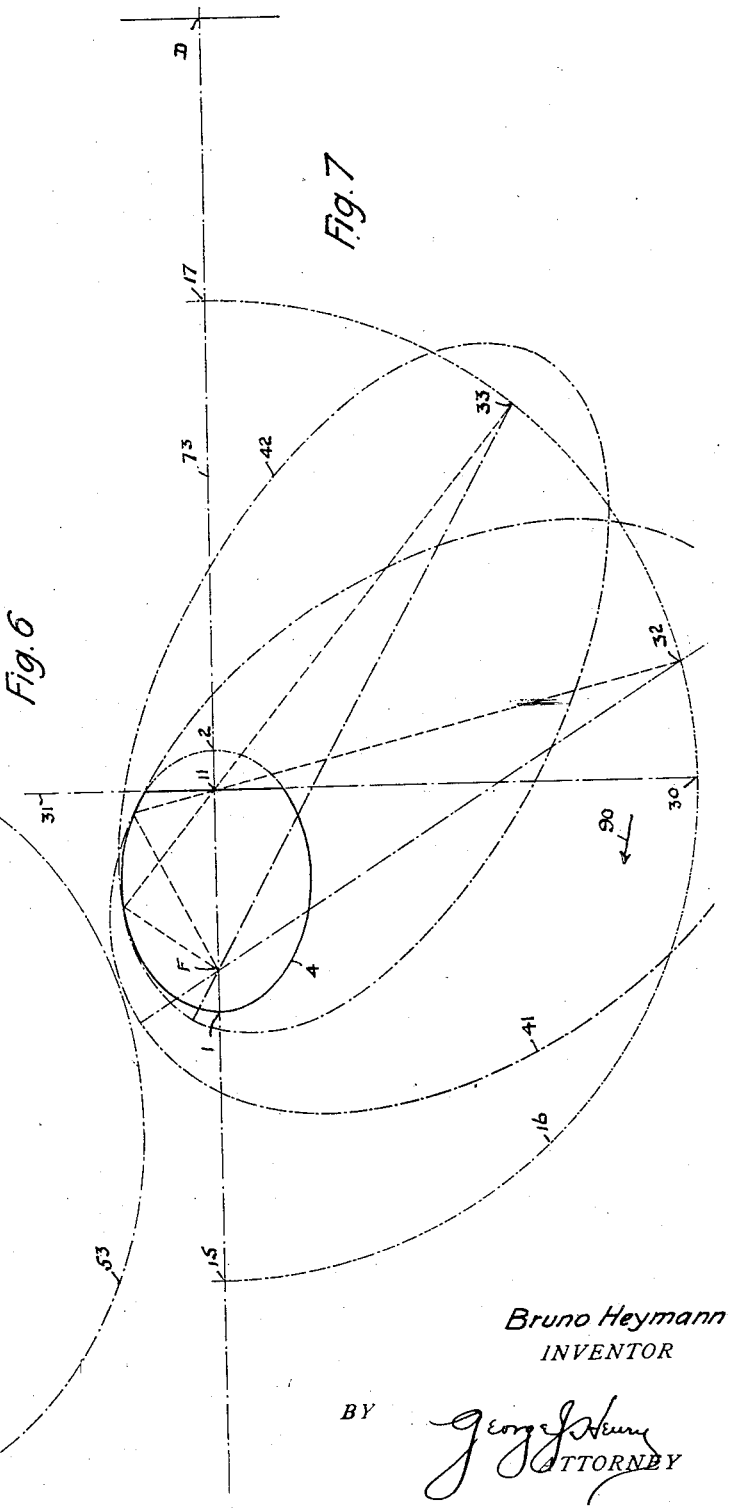
Bruno Heymann
INVENTOR

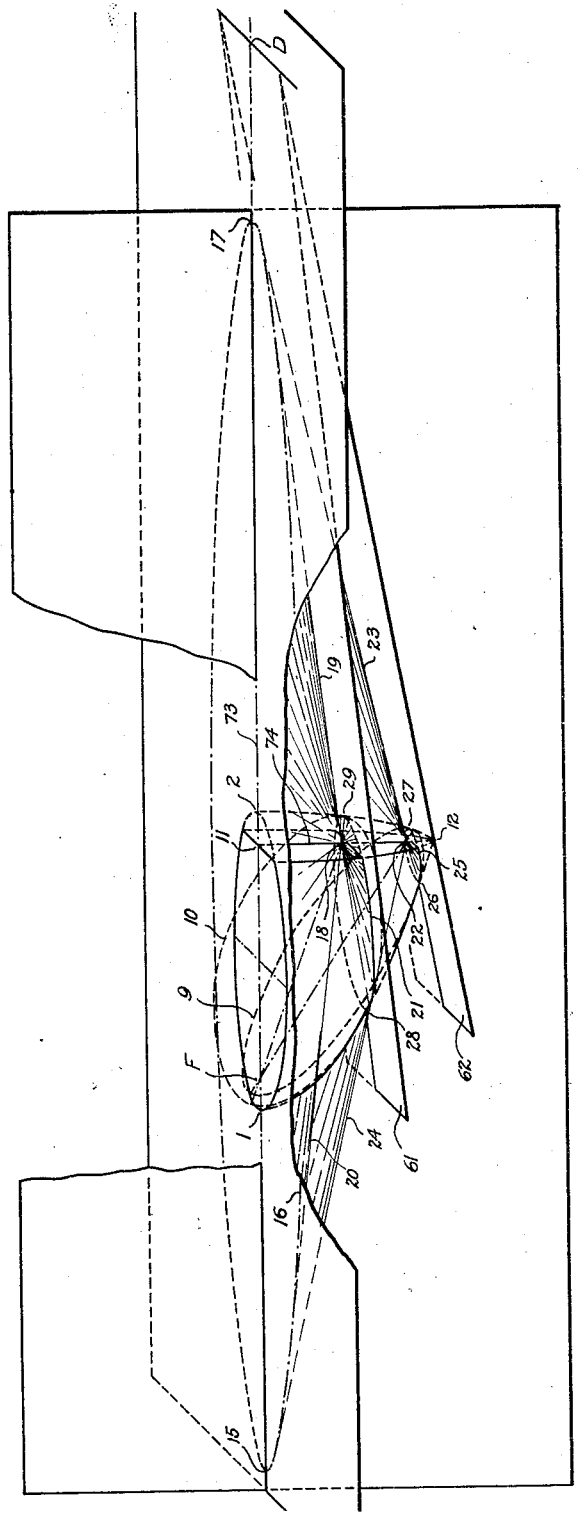

Patented Mar. 1, 1932

1,847,482

UNITED STATES PATENT OFFICE

BRUNO HEYMANN, OF SAN FRANCISCO, CALIFORNIA

LIGHT PROJECTOR

Application filed July 23, 1928. Serial No. 294,698.

My invention has for its principal object a reflector adapted to project light through a narrow front aperture and to disperse all of the reflected rays on a field in front thereof producing a semi-circular band of light of high intensity and especially adapted to commercial illumination.

Another object is a reflector in combination with the second reflector as described in my copending application, Ser. No. 279,962 filed May 23, 1928 issued as Patent Number 1,758,041 on May 13, 1930 and which combination is especially useful as an automobile headlight.

Another object is a reflecting surface as herein described, in combination with a second reflector having the shape of a hemi-ellipsoid of revolution.

Another object is a reflector as described in combination with a second reflector of the same form and which combination is useful for street and display light, etc.

A further object is a light projector of the character described wherein the reflecting surface is the locus of intersections of consecutive members of a family of confocal ellipsoids of revolution with consecutive members of a pencil of right circular cones.

Described in another way, the reflecting surface is the locus of intersections of consecutive members of a family of ellipsoids of revolution all of which have one focus in common and of consecutive elements of a vertical axial pencil of planes.

A further object is a light projector of the character described, wherein the reflecting surface is the locus of points, the sum of whose distances from a fixed point, the light source as herein described, and a second moving point is a constant. Both points, the fixed and the moving one, lie in the same plane, the locus of the moving point is a circle through whose center, being displaced from the fixed point, passes an axial pencil of planes perpendicular to the plane of said circle. To all points on the trace, produced by the intersection of each element of the said axial pencil with the reflecting surface there corresponds one and only one point on said circular locus.

In this application the reflecting surface is intersected by a similar pencil of planes in elliptical arcs.

By referring to the accompanying drawings my invention will be made clear.

Other objects will appear from the drawings and specifications which follow:

In the drawings:

Fig. 6 is a diagram illustrating one mathematical method of generating the reflector surface of my invention.

Fig. 7 is similar to Fig. 6 but showing a different method of generating the same reflector surface.

Fig. 8 is a perspective showing of the several planes, cones and ellipsoids employed in generating the surface and the surface formed thereby, which is the subject matter of this invention.

Figs. 5 and 6 are presumed to be in planes at right angles to the plane of Fig. 7.

Fig. 8 is an amplification of Figs. 5 and 6 illustrating a method of construction of my surface, more fully described below.

Figures 3, 4:
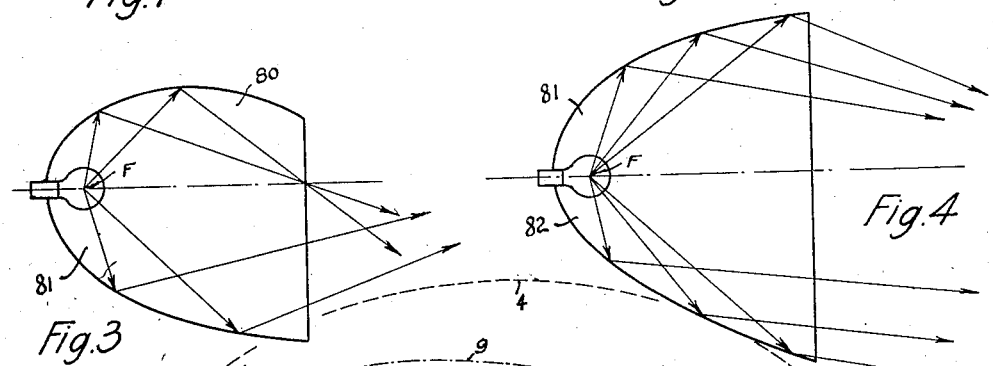
Fig. 3 is a longitudinal vertical central section of a complete light projector embodying one form of my invention in its lower half. In this figure the upper portion of the reflector is formed as a truncated hemi-ellipsoid of revolution, whereas the lower portion is in accordance with the invention herein disclosed.
Fig. 4 is a longitudinal vertical central section of a complete light projector embodying one form of my invention in the upper half.

The light-projector of Fig. 3 is advantageous for street lighting and when positioned at a curb, the upper portion 80 may be employed to concentrate a maximum illumination upon the sidewalk, and the lower portion 81, to distribute the light more advantageously over the street or vice versa according to the areas involved and/or illumination desired.

Fig. 4 illustrates a type particularly adapted to automobile use.

One method of constructing the reflecting surface of my light projector is to select a common focus F through which is drawn a horizontal line 73, a remote point 17 is chosen on line 73 where the reflected rays are to cross in the plane of the paper, see Fig. 6. Lay off, at right angles to line 73 through an assumed point 11, a line 74 and select thereon the point 12, see Figs. 5, 6 and 8.

From every point on the line 11, 12 as a focus and conjugate to focus F, construct an ellipse, of which there will be an infinite number, three of which are shown at 4, 9 and 10. The last of these ellipses will have degenerated into the line F, 12. Every one of these ellipses is now to be rotated upon its respective major axis, generating an infinite number of ellipsoids of revolution.

Figure 5:
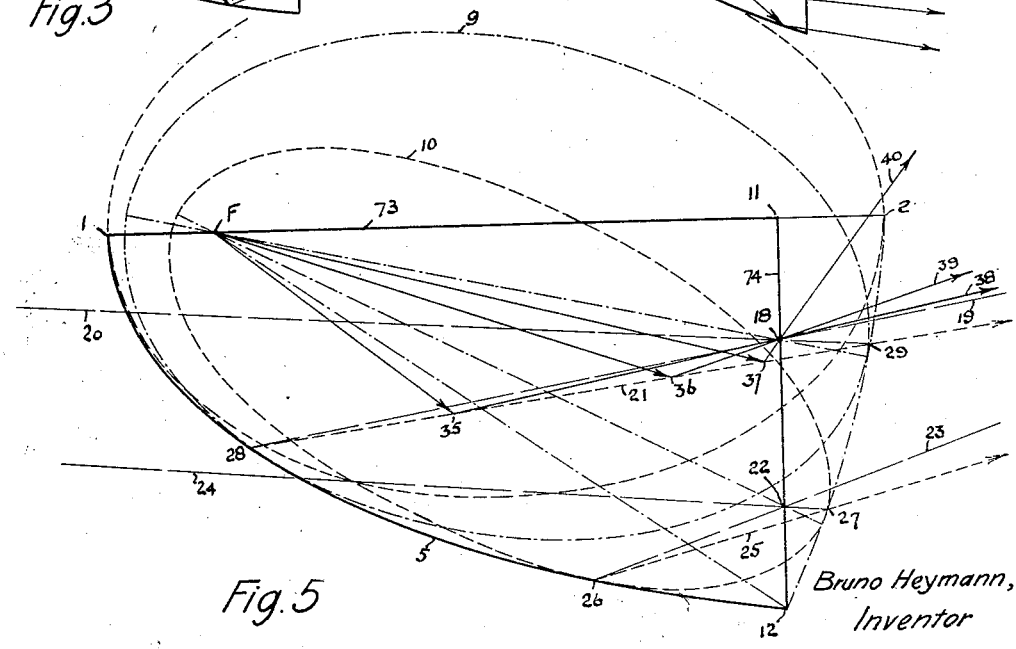
Fig. 5 is an enlarged view of a portion of Fig. 6 to better illustrate the construction.

With 11 as a center and in a plane at right angles to line 11, 12, describe a circular arc 15, 16, 32, 33, 17, see also Fig. 7. This circle is now to be employed as a common base for an infinite number of right circular cones, whose apexes lie on the line 11, 12 and which are therefore coincident with the conjugate foci of the corresponding aforesaid ellipsoids of revolution. Two of such cones corresponding with ellipsoids 9 and 10 are shown in Figs. 5 and 6 by their elements 19, 20 and 23, 24 respectively and having their apexes at the foci 18 and 22 respectively.

These cones, consisting of upper as well as lower nappes, intersect their corresponding ellipsoids in ellipses. The elliptic sections produced by the upper nappes are discarded for the purpose of this surface, while the elliptic sections produced by the lower nappes are elements and characteristics of my reflecting surface.

The present invention is directed to a reflector surface which is the envelope of the intersections of the said ellipsoids with the lower nappes of the corresponding cones. The ellipses thus produced are indicated in Figs. 5, 6 and 8 by numerals 21 and 25, having their vertices at 28, 29, and 26, 27, respectively. The planes 61 and 62 respectively of these ellipses 21 and 25 will be normal to the paper and will pass through a horizontal axis through D whose distance from F can readily be determined. The infinite number of intersections of the infinite pairs of ellipsoids and cones, which are immutably linked together by the requirement that the apex of each cone must coincide with the conjugate focus of its associated ellipsoid, will lie in a horizontal axial pencil of planes through D, and these intersections, being ellipses, and the only element common to both conoids, form the envelope 5 of my reflecting surface and constitute its characteristics.

The locus of the proximate vertices of the said ellipses is the elliptic arc 1, 28, 5, 26, 12 and the locus of their remote vertices is the elliptic arc 2, 29, 27, 12.

The portion of the reflector surface to the right of a plane through line 11, 12 perpendicular to the plane of the paper may be rejected for practical reasons and the remaining portion of this envelope forms the reflector surface of my invention.

Every point on this reflector surface will therefore be a point on one of the generating ellipsoids all having a common focus at F and will reflect light emanating from F, as at points 35, 36, 37 through its conjugate focus 18 and coincident with the apex of its corresponding cone, see Fig. 5 and such reflected rays will therefore emerge as rays 38, 39, 40 respectively.

All of these outgoing rays will therefore illuminate an object lying below the line 73, and between 11 and 17, and will illuminate an object above the line 73 if lying to the right of 17.

Referring to Figs. 6 and 7 an alternate method of constructing my reflector surface, based on the previous established dimensions, is as follows.

Draw an ellipse 50 whose foci are F and 17 and passing through 12 and whose center will be at O. With 11 as a center and with a radius 11—17 lay off the circular arc 15, 16, 32, 33, 17. With F as common focus and the said circular arc as the locus of the conjugate foci lay off an infinite number of elipses whose major axes are constant and equal to the major axis of ellipse 50. Four such ellipses are shown at 50, 41, 42, and 53 respectively. Next revolve all these ellipses about their respective major axes thus producing ellipsoids of revolution all of which possess constant major axes but variable parameters and one common focus at F. It is to be noted that all these ellipsoidal surfaces have one, and only one point in common, i. e. the conical point 12.

If now we pass a plane at right angles to the plane of the paper through each of the conjugate forci 32, 33 and the line 11, 12, each of said planes will intersect its corresponding ellipsoid in an ellipse and the portion of this ellipse proximate to the common focus F forms an element of my reflecting surface, and which will then be composed of an infinite number of these elliptic arcs, one only being taken from each of the infinite number of ellipsoids above described.

All of these arcs have but one point in common, the point 12 and the useful reflecting surface will be generated by such arcs which have been produced by a vertical axial pencil of planes revolving about the line 11, 12 throughout 180° from 30 to 31, in the direction of the arrow 90.

The vertical plane through 17, 11 will have intersected the ellipsoid 50 on the elliptical arc 5.

The surface which has now been constructed by either of the above methods may be visualized as a conic web composed of variable elliptic elements formed in planes penciling about a horizontal axis through the point D, in the first method above described or about the vertical axis 11, 12, in the second method above described.

In tracing the path of a pencil or rays emanating from the light source F and being reflected on my surface, let it be assumed that the rays originating at F are reflected at 35, 36, 37 respectively, after impinging on the ellipse 21 they will then proceed in the shape of a circular cone having its apex at 18.

This is true because 18 is the conjugate focus of the ellipsoid of revolution whose other focus was F, and it is this ellipsoid of revolution which has furnished the elements, or reflecting increments at 35, 36, 37 of the ellipse 21. These reflected rays, after passing through the focus 18, emerge from the projector in an upward diverging direction indicated respectively by the arrows 38, 39, 40, illuminating objects below the horizontal plane through line 73 (Figs. 5, 6 and 8) provided these objects are placed between the points 11 and 17, or illuminating objects above the said horizontal plane 73 provided these objects are placed in front of the aperture and beyond point 17.

A light ray reflected from the common focus F on any of the vertical elliptic elements which make up my reflector surface will follow a path drawn through the conjugate focus of their associated ellipsoids and therefore follow a line drawn from the arc 15, 16, 32, 33 and through the point of reflection. Such a path is however also one of the conical elements above described, which proves the identity of the surfaces constructed by either of the two methods described above.

It will now be seen that my light projector collects and reflects the greatest amount of light from the light source F, and distributes it most efficiently through the narrow slot or front 54.

Figures 1, 2:
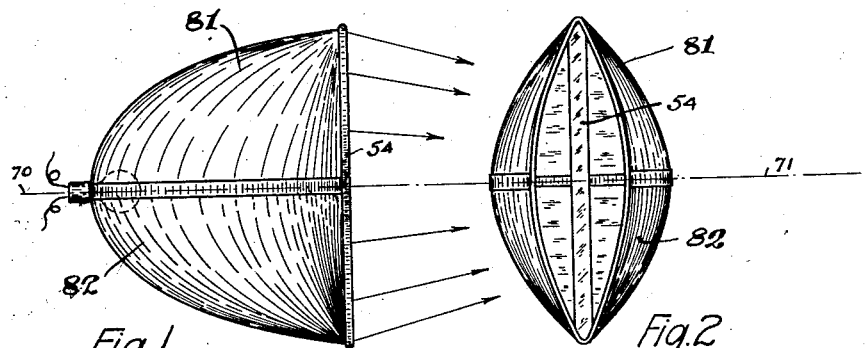
Fig. 1 is a side view of a complete light projector embodying my invention in the upper and lower halves.
Fig. 2 is a front view of the same.

In the case of a combination as shown in Fig. 1 wherein the halves of the reflecting surface are in accordance with my herein described invention, the light field will be a semicircular band of light of equal width on each side of a plane normal to the paper on the line 70, 71 of high intensity and of any desired width.

I claim:

1. A reflecting surface which is the internal envelope of a family of ellipsoids of revolution with constant major axes, said ellipsoids having one common focus and the locus of the conjugate foci being a circle whose center is displaced from said common focus, said major axes forming a pencil the plane of which passes through said common focus.

2. A reflecting surface which is the internal envelope of consecutive plane sections of a family of horizontally arranged ellipsoids of revolution said ellipsoids having one common focus, variable parameters but constant major axes, with a vertical pencil of planes whose axis passes through the center of a circle which is the locus of the conjugate foci of said ellipsoids, the plane of said circle containing said common focus.

3. A reflecting surface which is the locus of points the sum of whose distances from a fixed point and certain conjugated points is a constant, the locus of said conjugated points being a circle whose plane passes through said fixed point and whose center is displaced from said fixed point; through the center of said circle and normal to its plane passes an axial pencil whose traces on the reflecting surface are its characteristics and whose intersections with said circle are said conjugate points.

4. A reflecting surface which is the locus of consecutive intersections of a family of ellipsoids of revolution of constant major axes in one and the same plane, said ellipsoids having one common focus and the locus of the conjugate foci of said ellipsoids being a circle the plane of which passes through said common focus, said circle being described from a center other than said common focus, and a pencil of planes whose axis passes through said center and is normal to the plane of said circle.

5. A reflecting surface which is an external envelope of consecutive intersections of a family of ellipsoids of revolution having variable major axes all of said ellipsoids having one common focus, having major axes lying in one and the same plane and having conjugate foci lying on a straight line, and a right circular cone for each of said ellipsoids having its apex coincident with said conjugate focus, all of said cones forming a pencil whose base is normal to said straight line and passes through said common focus, said intersections forming a family of ellipses, said ellipses diminishing according to an elliptic law.

BRUNO HEYMANN.